United States Patent Office 3,334,063
Patented Aug. 1, 1967

3,334,063
INSULATING MATERIAL
Mayer Berliner, Schenectady, N.Y., assignor to General
Electric Company, a corporation of New York
No Drawing. Filed June 29, 1965, Ser. No. 468,111
7 Claims. (Cl. 260—41)

ABSTRACT OF THE DISCLOSURE

Electrical insulating material comprising a major proportion of ethylene-propylene rubber and a minor proportion of methacrylic ester monomer along with tackifier material, peroxide curing material and filler materials, is characterized by good electrical and physical qualities including corona resistance.

This invention relates to electrical insulating tapes. More particularly, the invention relates to self-amalgamating electrical insulating and jacketing tape having desirable physical and electrical characteristics.

Electrical insulating and jacketing tapes are well known. However, such tapes generally represent a compromise between the various physical and electrical properties which are attainable in a single tape. It is a primary purpose of the present invention to provide an electrical insulating tape which is characterized by salutary physical and electrical properties including good dielectric strength, good amalgamation, high form stability and tensile strength and superior tapeability.

Briefly, the invention relates to electrical insulating tapes consisting of, by weight (1) 100 parts ethylene-propylene rubber, (2) from 20 to 80 parts of finely divided platy talc or, alternatively, from about 20 to 60 parts of fumed silica or mixtures of these fillers, (3) an effective amount, generally about 1.0 of a stabilizer to stabilize the tape against oxidative degradation at elevated temperatures, (4) from about 15 to 20 parts of petroleum resin tackifier, (5) from 15 to 20 parts of polyterpene resin tackifier, (6) from 3 to 6 parts, and preferably 4.5 parts, of a peroxide catalyst, (7) from about 1 to 5 parts of a coagent curative consisting of acrylic ester monomer to act in conjunction with the peroxide catalyst, and (8) 3 to 6 parts of carbon black filler. The terpene polymer can be used alone in an alternative formulation in amounts of from 30 to 40 parts, eliminating the petroleum resin although both are present in the preferred material. It has further been found that the aforementioned formulation exhibits superior heat stability, electrical insulating properties and physical characteristics as more fully detailed hereinafter. In preparing the tape, all of the ingredients except the catalyst and coagent curative are mixed together in any desired order and blended together on hot rolls at a temperature of from about 110° C. to 140° C. for from about 20 to 25 minutes. At this point the catalyst materials are added after the rolls and material have cooled to a temperature of less than 90° C. and preferably to 50° C., the rolling operation being continued until the catalyst is thoroughly admixed with the remainder of the ingredients.

Those features of the invention which are believed to be novel are set forth with more particularity in the claims appended hereto. The invention, will, however, be better understood and further objects and advantages thereof appreciated from a consideration of the following description.

The ethylene-propylene rubber used in conjunction with the present invention is an amorphous or noncrystalline elastomeric polymer polymerized in well known manners from ethylene and propylene monomers using polymerization catalysts. The specific polymer used herein in an exemplary fashion is known as EPR 404 and is manufactured by the Enjay Chemical Company and has an ethylene content of 43 weight percent and is curable with peroxides as hereinafter more particularly described. The Mooney viscosity is from about 30 to 50 measured at 212° F. Such ethylene-propylene rubbers are described widely in the prior art including Canadian Patent 692,845.

The platy talc used in connection with the present invention is a finely ground magnesium silicate derived from the mineral talc. Among the platy talcs useful in connection with the present invention is Mistron Vapor talc manufactured by the Sierra Talc Company, having a surface area of about 19.5 square meters per gram.

The alternative finely divided fumed silica filler prepared from burning silica tetrachloride is typified by "Cab-O-Sil" manufactured by the Cabot Corporation.

One polymerization stabilizer preferably used in connection with the present invention is a polymerized trimethyldihydroquinoline known as Agerite Resin D and manufactured by the R. T. Vanderbilt Company. Other quinoline derivatives as well as quinone and hydroquinone can be used among others. Many such materials will occur to those skilled in the art.

The petroleum hydrocarbon resins useful in conjunction with the present invention are particularly those produced by the homopolymerization and copolymerization of dienes and olefins of the aliphatic alicyclic and monobenzenoid aryl alkene types derived from the distillaion of cracked petroleum stocks. Such polymerized petroleum resins are described widely in the art, including Canadian Patent 531,202 and U. S. Patent 3,085,026.

A typical modified polymerized hydrocarbon tackifier or polymerized hydrocarbon resin used in connection with the present invention is known as Piccopale 100 manufactured by the Pennsylvania Industrial Chemical Corporation. Piccopale 100 is a 100% polymerized petroleum resin of the above description having a melting point of from about 97 to 103° C., an acid number of less than 1, and a molecular weight of 1100.

The terpene resins useful in conjunction with the present invention are generally those consisting of homopolymers and copolymers of alpha pinene, beta pinene, dipentene and related terpene polymers, such materials being described in the art, for example, in U.S. Patent 2,335,910.

A typical polyterpene tackifier constituent useful in the present connection is typified by Piccolyte S–115 manufactured by the Pennsylvania Industrial Chemical Corporation. This material is a light colored resin having a softening point of about 115°, a molecular weight of about 1200 and an acid number of about 0.

The peroxide catalysts useful in the present connection are typified by di-α-cumyl peroxide, although a wide variety of such materials can be used.

Among the tertiary peroxides which can be used to cure polyethylene containing the preferred fillers are those having the following formula

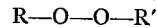

where R and R' (which may or may not be similar) are radicals selected from the group consisting of

and

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$, and $R_6$. $R_1$, $R_2$, $R_3$, $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butylmethylcyclohexyl, isopropylcyclohexyl, etc.; cycloalkylalkyl radicals, such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

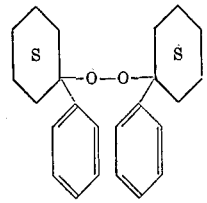

Mixtures of these peroxides may also be used. In addition, the peroxides may contain inorganic groups, such as halogens, nitro groups, etc., for example, chlorphenyl, bromophenyl, nitrophenyl, etc.

The peroxides can be prepared by any of the methods known to the art. For example, di-α-cumyl peroxide,

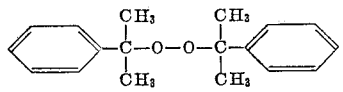

(sold by Hercules Powder Co. of Wilmington, Del.), can be prepared by the method described by Kharasch et al. in the Journal of Organic Chemistry 15, pages 756–762 (1950), tert-butyl-α-cumyl peroxide,

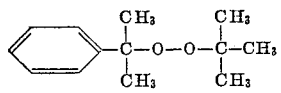

by the method of Kharasch et al. in the Journal of Organic Chemistry 15, pages 775–781 (1950), etc. Other peroxide curing agents can be used but generally those which are non-scorching are preferred.

Used in connection with the present invention to enhance the crosslinking effect of the curing agent are such materials as acrylic ester monomers. These materials, generally speaking, are methacrylates, such as ethylene glycol dimethacrylate, triethylene glycol dimethacrylate, polyethylene glycol dimethacrylate, tetraethylene glycol dimethacrylate, trimethylol propane trimethacrylate, and the like. They are typified by an ethylene glycol dimethacrylate known as SR 206 made by Sartomer Resins, Inc. Another material which may be used is trimethylol propane trimethacrylate known as SR 350 manufactured by the same concern. It has been found that the acrylic ester monomers produce the best results as coagent curatives. However, other materials such as polybutadiene, typified by Enjay Buton 150, can also be used.

Any of a number of carbon black materials can be used in connection with the invention to impart color and principally ultraviolet resistance to the material, including any of the usual channel black carbon blacks, preferably having a particle size in the order of 10 millimicrons. Among the well-known materials which can be so used is Black Pearls 74 manufactured by the Cabot Corporation.

The following examples will illustrate the practice of the present invention, it being realized that they are not to be taken as limiting in any way.

*Example 1*

There were mixed together thoroughly on hot rolls heated to a temperature of 110° C. the following materials by weight:

| | Parts |
|---|---|
| EPR 404 ethylene-propylene copolymer rubber | 100 |
| Mistron platy talc | 60 |
| Piccopale 100 polymerized hydrocarbon | 19 |
| Piccolyte S-115 terpene polymer | 19 |
| Agerite Resin D | 1 |
| Black Pearls 74 channel carbon black | 4 |

When the above materials had been thoroughly admixed on a two-roll mill at 110° C.–140° C. for about 30 minutes, there was added at a mix and roll temperature of 50° C., 6 parts of DiCup 40C dicumyl peroxide having a content of 40% peroxide or about 2.4 parts of peroxide and 5 parts of SR 206 ethylene glycol dimethacrylate monomer as a coagent curative. The product was then calendered to provide a sheet or tape 20 mils thick which was further cured at 130° C. for 24 hours. In general, the material can be cured at 120° C. to 150° C. for up to 24 hours, the cure being of a time-temperature nature. The above tape was tested for various physical and electrical properties with the results shown below:

TABLE I

| | | |
|---|---|---|
| Tensile strength (ASTM D-1373) | p.s.i. | 858 |
| Elongation (ASTM D-1373) | percent | 940 |
| Ozone resistance (ASTM D-1373) | | No effect |
| Brittle point (ASTM D-473) | °C | -55 |
| Normal cable temperature rating | °C | 90 |
| Emergency cable temperature rating | °C | 130 |
| Water absorption (UL 510) | | 0.19 |
| Weather resistance | | Excellent |
| Dielectric strength (ASTM D-1000) | v.p.m. | 1165 |
| Dielectric constant (ASTM D-295-58) | | 2.36 |
| Power factor (ASTM D-295-58) | | 0.0066 |
| Corona resistance (IPCEA S-19-81) at 150 v./mil. | hours | >1000 |

When wound about a cable or other structure, the material fuses into a homogeneous mass by reason of its own compressive force and self-amalgamating character. The material remains flexible at temperatures below −40° F. but, on the other hand, will not melt or flow even after several days exposure to temperatures as high as 260° F. The salutary electrical characteristics allow the splicing of power and control cables without heavy build-ups or multiple layers of insulating and jacketing tapes. It has an exceptional corona resistance at 150 volts per mil of well over 1000 hours. Such stresses, on the other hand, generally lead to failure of ordinary butyl and polyethylene base tapes in less than one day. When the above tape was used in actual cable splices and the conductor temperature raised to 90° C. three times daily from room temperature, there was no appreciable change in 60 cycle power factor after 90 days. On the other hand, a butyl rubber base tape splice having the same wall thickness had a power factor change under the above conditions of over 100 percent. When the present tape was aged for seven days at 130° C., it retained about 97 percent of its original tensile strength. When a butyl rubber base tape was so treated, it was degraded beyond use as was a tape of blended polyethylene and butyl rubber.

Generally speaking, the present tapes in order to meet the most widespread use in the field should have a tensile strength of from about 400 to 900 p.s.i., an elongation of from about 500 to 1100, a 60 c.p.s. power factor tested at 90° C. of 2.0 maximum, a dielectric strength of 1000 volts per mil minimum, a compressive flow of 10 percent or less, and a tensile strength (modulus) at 100 percent elongation of from about 130 to 220 p.s.i. They should have form stability at temperatures up to 120° C. continuously and 130° C. intermittently. It has been found that these rigorous specifications can be met only by holding to the present ingredients within the ranges stated.

*Example 2*

Example 1 was repeated in every respect except that the quantity of platy talc or Mistron Vapor talc was varied in the formulation of Example 1. It was found that when such proportions of materials were used, the tensile strengths, elongations, percent power factor at 90° C., 60 cycle and the dielectric strength and volts per mil were as shown in Table II below. However, it will be noted, as shown in the table, that when 10 parts of this platy talc material were used, the percent elongation was excessively high, causing excessive stretching and necking under the stresses of taping. Amounts of platy talc material over 80 parts per 100 parts of ethylene-propylene rubber were found not to impart any better characteristics to the material.

TABLE II

| Parts Talc | Tensile | Elongation | Percent PF at 90° C., 60 Cycle | D.S. v./mil. |
|---|---|---|---|---|
| 10 | 480 | 1,300 | 0.26 | 1,100 |
| 20 | 605 | 955 | 0.24 | 1,040 |
| 40 | 580 | 905 | 0.36 | 1,080 |
| 60 | 405 | 850 | 0.94 | 1,120 |
| 80 | 440 | 760 | 1.22 | 1,100 |

*Example 3*

Example 1 was repeated in every respect except that Cab-O-Sil fumed silica was used in place of the Mistron Vapor platy talc in amounts of 10, 20, 40, 60 and 80 parts per 100 parts of ethylene-propylene copolymer with the results shown in Table III below.

TABLE III

| Parts Fumed Silica | Tensile | Elongation | Percent PF at 90° C., 60 Cycle | D.S. v./mil. |
|---|---|---|---|---|
| 10 | 580 | 1,238 | 0.42 | 1,130 |
| 20 | 680 | 915 | 0.37 | 1,140 |
| 40 | 745 | 615 | 0.14 | 1,090 |
| 60 | 915 | 717 | 0.24 | 9,900 |
| 80 | 880 | 610 | 0.38 | 900 |

From the above it will be noted that when over about 80 parts of Cab-O-Sil were used, the dielectric strength of the material was deficient. On the other hand, when less than about 20 parts of the filler material concerned were employed, the elongation was excessive.

It has been found that when other silica materials such as diatomaceous earth and precipitated silica are used, the power factor and dielectric constant at elevated temperatures are excessively high. Larger proportions of carbon black than those specified for ultraviolet protection will, of course, also degrade the electrical properties.

*Example 4*

Using as a base formulation, 100 parts of EPR 404 ethylene-propylene copolymer, 1 part Agerite Resin D, 4 parts carbon black, 6 parts dicumyl peroxide and 5 parts ethylene glycol dimethacrylate coagent curative, the petroleum polymer (Piccopale 100) and terpene polymer (Piccolyte S-115) tackifier amounts were varied from about 5 parts to 35 parts per 100 parts of ethylene-propylene rubber, the processing and other conditions being as in Example 1 with the results shown below.

TABLE IV

| | P.p.h. of ethylene-propylene rubber | | | |
|---|---|---|---|---|
| Petroleum Resin | 5 | 15 | 25 | 35 |
| Polyterpene Resin | 5 | 15 | 25 | 35 |
| (Dunlop Tackmeter) (gms.) | 370 | 680 | 590 | 490 |
| Compressive Flow (percent) at 125° C. (60 min.) | 6.6 | 8.8 | 15.5 | 24.5 |

From the above it will be seen that the tackifiers should each be used in amounts ranging from about 15 to 20 parts per 100 parts of ethylene-propylene rubber in order to realize proper amalgamation characteristics as measured by the tackmeter and desirable form stability at elevated temperatures as measured by compressive flow.

*Example 5*

Example 1 was repeated in every respect except that 15 parts of Piccopale 100 and Piccolyte S-115 were used and the SR 206 ethylene glycol dimethacrylate co-curing agent was omitted. When tested, the room temperature tensile strength of the material was found to be only 171 p.s.i. which is less than the minimum for good results. On the other hand, with the co-curing agent in use as in Example 1, the tensile strength was well within the required range. The tapeability of the 20 mil thick material as measured by the tensile strength (modulus) at 100 percent elongation is increased from 116 p.s.i. without the co-curing agent to 155 p.s.i. with this agent.

While the present materials are described herein particularly with respect to their tape or sheet form, it will be realized that the materials can be used in bulk as molding compounds to form definite structural shapes or to fill voids. There are provided, then, by the present invention electrical insulating and jacketing materials which are characterized by superior electrical and physical characteristics. Tey are endowed with excellent dielectric strength and power factor under adverse temperature and other environmental conditions, including moisture. They are characterized by good form stability even at elevated temperatures, which enables them to resist physical failure under the flexing of cables to which they are applied and under the influence of other physical abuse. The excellent amalgamating qualities of the tape enable it to seal together without corona-sensitive voids. Their tensile strength is such that they do not fail or neck out under the stresses of taping and their elongation, while not excessive, permits the preparation of tight, compact splices, joints and terminations for electrical conductors.

What I claim as new and desire to secure by Letters Patent of the United States is:

1. Electrical insulating material comprising by weight 100 parts ethylene-propylene rubber, 30 to 40 parts of a rubbery tackifier material, from about 3 to 6 parts of peroxide curing agent, an effective amount of inhibitor for said peroxide curing agent, from about 1 to 5 parts of methacrylic ester monomer, from about 3 to 6 parts of carbon black, and a filler selected from the group consisting of from 20 to 80 parts of finely divided platy talc and 20 to 60 parts of fumed silica.

2. Electrical insulating tape comprising 100 parts of ethylene-propylene rubber, from about 30 to 40 parts of a rubbery tackifier, from about 3 to 6 parts of a peroxide curing agent, about 1 percent of an inhibitor for said peroxide curing agent, from about 1 to 5 percent of a methacrylic ester monomer co-curing agent, from about 3 to 6 parts of carbon black, and a filler selected from the group consisting of 20 to 80 parts of platy talc and 20 to 60 parts of fumed silica.

3. Electrical insulating material comprising by weight 100 parts of ethylene-propylene rubber, from about 15 to 20 parts of petroleum resin tackifier, from about 15 to 20 parts of polyterpene resin tackifier, from about 3 to 6 parts of peroxide curing agent, an inhibitor for said peroxide curing agent, from about 1 to 5 parts of a methacrylic ester monomer, from about 3 to 6 parts of carbon black and a filler selected from about 20 to 80 parts of finely divided platy talc and 20 to 60 parts of fumed silica.

4. Electrical insulating tape comprising by weight 100 parts of ethylene-propylene rubber, 60 parts finely divided platy talc, 19 parts petroleum resin, 19 parts polyterpene resin, 1 part polymerized trimethyldihydroquinoline, 4 parts carbon black, 6 parts dicumyl peroxide, and 5 parts ethylene glycol dimethacrylate.

5. Electrical insulating tape comprising by weight 100 parts of ethylene-propylene rubber, 60 parts finely divided platy talc, 15 parts petroleum resin, 15 parts polyterpene resin, 1 part polymerized trimethyldihydroquinoline, 4 parts carbon black, 6 parts dicumyl peroxide, and 5 parts ethylene glycol dimethacrylate.

6. Electrical insulating material comprising a major proportion of ethylene-propylene rubber and a minor proportion of methacrylic ester monomer along with tackifier material, peroxide curing material, an inhibitor for said peroxide curing material, carbon black, and a filler material selected from finely divided platy talc and fumed silica and mixtures thereof.

7. An electrical insulating tape comprising a major proportion of ethylene-propylene rubber and a minor proportion of methacrylic ester monomer along with tackifier material, peroxide curing material, an inhibitor for said peroxide curing material, carbon black, and a filler material selected from finely divided platy talc and fumed silica and mixtures thereof.

References Cited
UNITED STATES PATENTS 2,864,882  12/1958  Snell.

MORRIS LIEBMAN, *Primary Examiner.*

S. L. FOX, *Assistant Examiner.*